O. H. JOHNSON.
WHEEL CONSTRUCTION.
APPLICATION FILED FEB. 28, 1921.
1,390,909.
Patented Sept. 13, 1921.
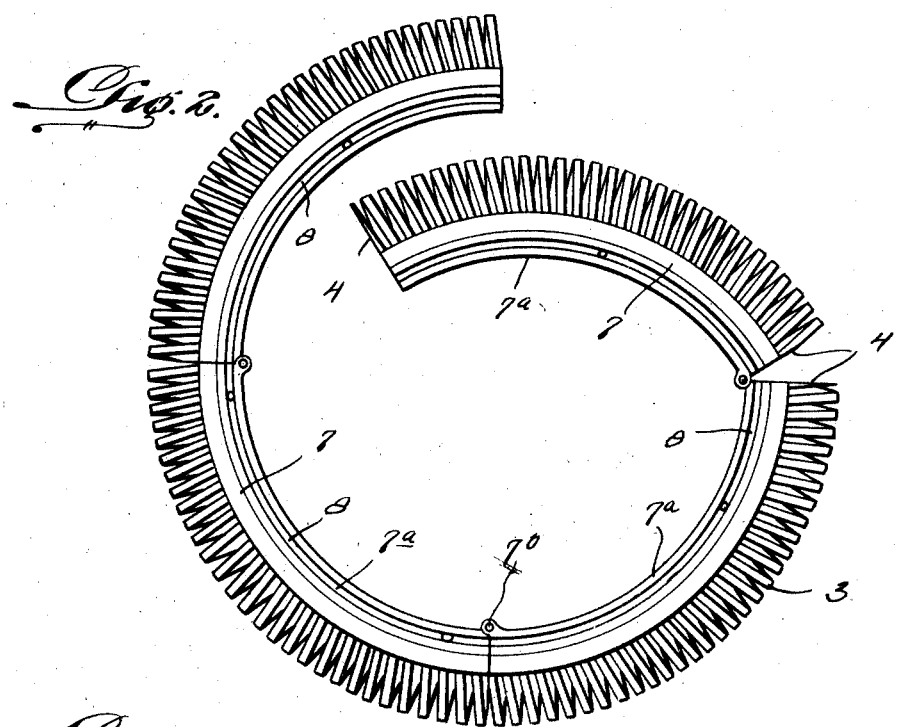
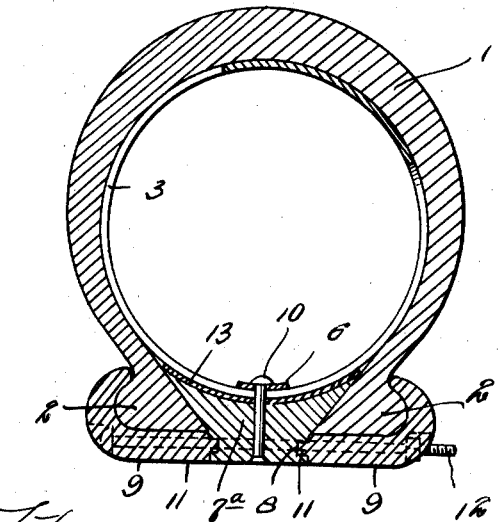
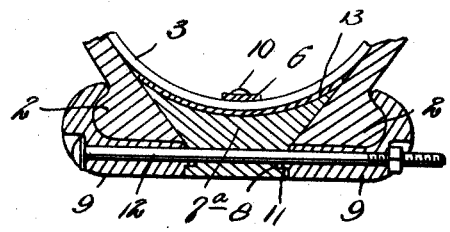
O. H. Johnson,
INVENTOR
BY Victor J. Evans.
ATTORNEY

UNITED STATES PATENT OFFICE.

OLOF H. JOHNSON, OF SEATTLE, WASHINGTON.

WHEEL CONSTRUCTION.

1,390,909. Specification of Letters Patent. Patented Sept. 13, 1921.

Application filed February 28, 1921. Serial No. 448,511.

*To all whom it may concern:*

Be it known that I, OLOF H. JOHNSON, a citizen of the United States, residing at Seattle, in the county of King and State of Washington, have invented new and useful Improvements in Wheel Construction, of which the following is a specification.

The object of my present invention is the provision of an improved wheel construction, and one adapted more especially for use when cushioning spring means is employed within the tire casing to lend resiliency thereto.

To the attainment of the foregoing, the invention consists in the improvement as hereinafter described and definitely claimed.

In the accompanying drawings, forming part hereof:—

Figure 1 is a transverse section on a large scale illustrating my improvement.

Fig. 2 is a side elevation illustrating the rim and coiled springs without the casing, and also illustrating the capacity of the rim to flex.

Fig. 3 is a fragmentary detail view in transverse section, hereinafter explicitly referred to.

Similar numerals of reference designate corresponding parts in all of the views of the drawings.

My improvement is of the type that is not liable to be affected by cuts or punctures of the casing 1, which casing may be and preferably is of the ordinary well known type with clencher flanges 2 on its edges.

Within the casing 1 is disposed coiled springs 3 having ends 4, Fig. 2, and also having flat convolutions.

At 6 are retaining strips of metal, arranged in the coiled springs 3 and fastened to the longitudinal central member 7 of the rim; the said longitudinal central member 7 being preferably of metal and being formed in four sections 7ª, hinged together in series at the points 7ᵇ. The sections are provided in the opposite sides of their inner portions with longitudinal channels 8. At this point I would have it understood that it is desirable to make the springs 3 of such a size that when the side members 9 of the rim are moved laterally inward, the springs will exert equal pressure against the casing 1 and will adequately cushion the said casing 1 at all points.

The springs 3 and the strips 6 are fastened to the adjacent rim sections 7ª as indicated by 10 in Fig. 1.

The side members 9 of the rim are each continuous and are each provided on their inner edges with tongues 11 designed and adapted to snugly fit in the channels 8 of the sections 7ª comprised in the longitudinal central member 7. The said side members 9 are connected together and to the sections 7ª of the member 7 through the medium of transverse threaded bolts of which a suitable number are employed; the said threaded bolts being numbered 12 and being arranged equi-distantly from each other. Manifestly the said bolts 12 may be expeditiously and easily placed in position, and they are susceptible of being as readily removed when the ordinary lugs of an automobile wheel are tightened.

When deemed expedient a piece of fabric indicated by 13 may be interposed between the longitudinal central member 7 of the rim and the springs 3 with a view to affording a practically continuous flexible seat for the said springs 3. It will be apparent from the foregoing that my novel rim construction as a whole is calculated to adequately cushion a wheel and at the same time is not unduly heavy and is not liable to be affected by cuts or punctures in the casing 1.

Having described my invention, what I claim and desire to secure by Letters-Patent, is:—

1. The combination of coiled spring means, a casing in which the spring means is inclosed, said casing having clencher flanges, a longitudinal central rim member made up of a series of sections hinged together and connected to intermediate points of the spring means and having longitudinal channels in their sides, side rim members adapted to engage the clencher flanges and having tongues on their inner edges disposed in the said channels of the central sections, bolts extending through and connecting the central sections and the side members, and a flexible layer interposed between the central sections of the rim and the spring means.

2. The combination of coiled spring means, a casing in which the spring means is inclosed, a longitudinal central rim member made up of hingedly connected sections attached to the spring means, and side sections adapted to engage and hold the casing and connected to the longitudinal central member and together.

3. The combination of coiled spring means, a casing in which the spring means is inclosed, a longitudinal central rim member made up of hingedly connected sections attached to the spring means, and side sections adapted to engage and hold the casing and connected to the longitudinal central member and together; the sections of the longitudinal central rim member having channels in their sides, and the said members of the rim having tongues disposed in said channels.

In testimony whereof I affix my signature.

OLOF H. JOHNSON.